United States Patent
Sun et al.

(10) Patent No.: US 11,824,783 B2
(45) Date of Patent: Nov. 21, 2023

(54) MAXIMUM DATA BURST VOLUME (MDBV) DETERMINING METHOD, APPARATUS, AND SYSTEM

(71) Applicant: Huawei Technologies Co., Ltd., Shenzhen (CN)

(72) Inventors: Haiyang Sun, Beijing (CN); Fang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 17/550,546

(22) Filed: Dec. 14, 2021

(65) Prior Publication Data

US 2022/0103482 A1 Mar. 31, 2022

Related U.S. Application Data

(63) Continuation of application No. PCT/CN2020/085218, filed on Apr. 16, 2020.

(30) Foreign Application Priority Data

Jun. 14, 2019 (CN) .......................... 201910516690.9

(51) Int. Cl.
*H04L 47/20* (2022.01)
*H04L 12/14* (2006.01)
(Continued)

(52) U.S. Cl.
CPC .......... *H04L 47/20* (2013.01); *H04L 12/1407* (2013.01); *H04L 47/2408* (2013.01); *H04L 67/30* (2013.01); *H04W 28/0236* (2013.01)

(58) Field of Classification Search
CPC . H04L 47/20; H04L 12/1407; H04L 47/2408; H04L 67/30; H04L 67/14;
(Continued)

(56) References Cited

U.S. PATENT DOCUMENTS

2010/0046369 A1* 2/2010 Zhao .................... H04W 28/24
370/232
2020/0137615 A1* 4/2020 Joseph ................. H04W 24/02
(Continued)

FOREIGN PATENT DOCUMENTS

WO 2019032667 A1 2/2019

OTHER PUBLICATIONS

NEC, "Clarification on Enhancements for QoS Monitoring and Control," SA WG2 Meeting #130, Kochi, India, S2-1900245, total 3 pages, 3rd Generation Partnership Project, Valbonne, France (Jan. 21-25, 2019).

(Continued)

*Primary Examiner* — Afshawn M Towfighi
(74) *Attorney, Agent, or Firm* — Leydig, Voit & Mayer, Ltd.

(57) ABSTRACT

This application provides an MDBV determining method, apparatus, and system. The method includes: A first device determines an updated MDBV based on an updated segment packet delay budget, so that an access network device can use the updated MDBV. Therefore, according to an actual requirement of the access network device, a corresponding MDBV is generated for use. This helps ensure communication efficiency of the access network device.

19 Claims, 5 Drawing Sheets

(51) Int. Cl.
*H04L 47/2408* (2022.01)
*H04L 67/30* (2022.01)
*H04W 28/02* (2009.01)

(58) Field of Classification Search
CPC .. H04L 47/24; H04W 28/0236; H04W 40/24; H04W 4/24; H04M 15/66; H04M 15/8016; H04M 15/8214; H04M 15/8228; H04M 17/02; H04M 17/103
See application file for complete search history.

(56) References Cited

U.S. PATENT DOCUMENTS

| | | | | |
|---|---|---|---|---|
| 2020/0145876 | A1* | 5/2020 | Dao | H04W 28/06 |
| 2021/0058328 | A1* | 2/2021 | Xu | H04L 41/0803 |
| 2021/0368519 | A1* | 11/2021 | Liu | H04W 72/569 |
| 2023/0029236 | A1* | 1/2023 | Qiao | H04M 15/61 |

OTHER PUBLICATIONS

Ericsson, "Introduction of Maximum Data Burst Volume for all GBR flows," 3GPP TSG-SA2 Meeting #125, Gothenburg, Sweden, S2-181150, total 7 pages, 3rd Generation Partnership Project, Valbonne, France (Jan. 22-26, 2018).

"Update description for E2E Pdb division," 3GPP TSG-SA WG2 Meeting #132, S2-1903435 (Revision of S2-19xxxxx), Xi'an, China, Total 2 pages, 3rd Generation Partnership Project, Valbonne, France (Apr. 8-12, 2019).

"3rd Generation Partnership Project; Technical Specification Group Services and System Aspects; System Architecture for the 5G System; Stage 2 (Release 16)," 3GPP TS 23.501 V16.1.0, pp. 1-368, 3rd Generation Partnership Project, Valbonne, France (Jun. 2019).

"QoS Negotiation between 3GPP and TSN networks KI#3.1," SA WG2 Meeting #129, S2-1811021 (revision of S2-1811435), Dongguan, China, pp. 1-9, 3rd Generation Partnership Project, Valbonne, France (Oct. 15-19, 2018).

"QoS flow binding for URLLC services," 3GPP TSG-SA2 Meeting #127bis, S2-185207, Newport Beach, United States, Total 2 pages, 3rd Generation Partnership Project, Valbonne, France (May 28-Jun. 1, 2018).

* cited by examiner

MAXIMUM DATA BURST VOLUME (MDBV) DETERMINING METHOD, APPARATUS, AND SYSTEM

CROSS-REFERENCE TO RELATED APPLICATIONS

This application is a continuation of International Patent Application No. PCT/CN2020/085218, filed on Apr. 16, 2020, which claims priority to Chinese Patent Application No. 201910516690.9, filed on Jun. 14, 2019. The disclosures of the aforementioned applications are hereby incorporated by reference in their entireties.

TECHNICAL FIELD

This application relates to the field of mobile communication technologies, and in particular, to a maximum data burst volume (MDBV) determining method, apparatus, and system.

BACKGROUND

According to an existing 5th generation (5G) standard, for a guaranteed bit rate (GBR) quality of service (QoS) flow whose 5G QoS identifier (5QI) type is a delay critical GBR, a maximum data burst volume (MDBV) needs to be delivered. The MDBV defines a maximum volume of data that a 5G AN (for example, a RAN) is required to serve in a time period of a 5G access network (AN) packet delay budget (PDB).

The MDBV may use a standardized value, or may dynamically generate and overwrite the standardized value. A dynamic MDBV in a session management network element may be delivered by a policy control network element according to a policy and charging control (PCC) rule.

In an ultra-reliable low-latency communication (URLLC) service and a time-sensitive networking (TSN) service, the session management network element and an access network device may use an actual segment PDB (for example, a core network (CN) PDB or an AN PDB) based on a network topology. The CN PDB is a core network segment PDB, the AN PDB is an access network segment PDB, and a sum of the CN PDB and the AN PDB is equal to an end-to-end (E2E) PDB, that is, CN PDB+AN PDB=E2E PDB. For example, when a standardized 5QI is 84, the E2E PDB is 30 ms, the CN PDB is 5 ms, and the AN PDB is 25 ms.

The policy control network element may generate the MDBV based on the AN PDB, and send the MDBV to the access network device, so that the access network device can control traffic of a QoS flow based on the MDBV. In addition, for a QoS flow of a delay critical GBR, the access network device may use different AN PDBs for a same 5QI based on a topology. Therefore, the access network device may need to use different MDBVs for traffic control.

However, in the current standard, because the policy control network element is not aware of a network topology, the policy control network element can be aware of only a preconfigured CN PDB and a preconfigured AN PDB. Therefore, the PCF can generate a fixed MDBV based only on the preconfigured AN PDB, and send the fixed MDBV to the access network device. This cannot satisfy a requirement of the access network device.

SUMMARY

This application provides an MDBV determining method, apparatus, and system, so that an MDBV is dynamically generated based on an updated segment packet delay budget, to satisfy a requirement of an access network device.

According to a first aspect, this application provides an MDBV determining method. The method includes: A first device obtains an updated segment packet delay budget and service feature information; and the first device determines an updated MDBV based on the updated segment packet delay budget and the service feature information. Based on this solution, the first device determines the updated MDBV based on the updated segment packet delay budget, so that an access network device can use the updated MDBV. Therefore, according to an actual requirement of the access network device, a corresponding MDBV is generated for use. This helps ensure communication efficiency of the access network device.

In an embodiment, the first device is a policy control network element. That a first device obtains an updated segment packet delay budget includes: The policy control network element sends a request message to a session management network element, where the request message is used to request to subscribe to the updated segment packet delay budget; and the policy control network element receives the updated segment packet delay budget from the session management network element.

In an embodiment, that a first device obtains service feature information includes: The policy control network element receives the service feature information from an application function network element.

In an embodiment, the policy control network element sends the updated MDBV to the session management network element, where the updated MDBV is used to generate a service flow QoS profile.

In an embodiment, the first device is an application function network element. That a first device obtains an updated segment packet delay budget includes: The application function network element receives the updated segment packet delay budget from a session management network element or a policy control network element.

In an embodiment, the application function network element sends the updated MDBV to the policy control network element, where the updated MDBV is used to update a policy and charging control PCC rule.

According to a second aspect, this application provides an MDBV determining method. The method includes: A first device obtains an updated segment packet delay budget and an original MDBV; and the first device determines an updated MDBV based on the updated segment packet delay budget and the original MDBV. Based on this solution, the first device determines the updated MDBV based on the updated segment packet delay budget, so that an access network device can use the updated MDBV. Therefore, according to an actual requirement of the access network device, a corresponding MDBV is generated for use. This helps ensure communication efficiency of the access network device.

In an embodiment, the first device obtains an original packet delay budget. That the first device determines an updated MDBV based on the updated segment packet delay budget and the original MDBV includes: The first device determines the updated MDBV based on the updated segment packet delay budget, the original packet delay budget, and the original MDBV.

In an embodiment, the first device is a session management network element. The session management network element generates a service flow QoS profile based on the updated MDBV; and the session management network element sends the QoS profile to the access network device.

In an embodiment, that a first device obtains an original MDBV includes: The session management network element receives a PCC rule from a policy control network element, where the PCC rule includes the original MDBV.

In an embodiment, the first device is the access network device. That a first device obtains an original MDBV includes: The access network device receives a QoS profile from a session management network element, where the QoS profile includes the original MDBV.

According to a third aspect, this application provides an MDBV determining method. The method includes: A policy control network element obtains an updated segment packet delay budget; and the policy control network element determines an updated PCC rule based on the updated segment packet delay budget. Based on this solution, the policy control network element determines an updated MDBV based on the updated segment packet delay budget, and then determines the updated PCC rule based on the updated MDBV, where the updated MDBV in the updated PCC rule may be delivered to an access network device via a session management network element, so that the access network device can use the updated MDBV. Therefore, according to an actual requirement of the access network device, a corresponding MDBV is generated for use. This helps ensure communication efficiency of the access network device.

In an embodiment, the updated PCC rule includes the updated MDBV.

In an embodiment, the policy control network element obtains service feature information. That the policy control network element determines an updated MDBV based on the updated segment packet delay budget includes: The policy control network element determines the updated MDBV based on the updated segment packet delay budget and the service feature information.

In an embodiment, that the policy control network element obtains service feature information includes: The policy control network element receives the service feature information from an application function network element.

In an embodiment, the policy control network element sends the updated MDBV to a session management network element, where the updated MDBV is used to generate a service flow QoS profile.

In an embodiment, that a policy control network element obtains an updated segment packet delay budget includes: The policy control network element sends a request message to the session management network element, where the request message is used to request to subscribe to the updated segment packet delay budget; and the policy control network element receives the updated segment packet delay budget from the session management network element.

Based on any one of the implementation methods in the first aspect to the third aspect, in an embodiment, a segment packet delay budget is an access network segment packet delay budget or a core network segment packet delay budget.

Based on any one of the implementation methods in the first aspect or the third aspect, in an embodiment, the service feature information includes one or more of the following: a burst size, a service periodicity, a burst arrival time, a packet arrival time, and a packet size, where the burst size is used to indicate a data volume in one service periodicity.

According to a fourth aspect, this application provides an MDBV determining apparatus. The apparatus may be a first device (for example, a policy control network element or an application function network element), or may be a chip used in the first device. The apparatus has functions of implementing the embodiments of the first aspect. The functions may be implemented by hardware, or may be implemented by hardware executing corresponding software. The hardware or the software includes one or more modules corresponding to the functions.

According to a fifth aspect, this application provides an MDBV determining apparatus. The apparatus may be a first device (for example, a session management network element or an access network device), or may be a chip used in the first device. The apparatus has functions of implementing the embodiments of the second aspect. The functions may be implemented by hardware, or may be implemented by hardware executing corresponding software. The hardware or the software includes one or more modules corresponding to the functions.

According to a sixth aspect, this application provides an MDBV determining apparatus. The apparatus may be a policy control network element, or may be a chip used in the policy control network element. The apparatus has functions of implementing the embodiments of the third aspect. The functions may be implemented by hardware, or may be implemented by hardware executing corresponding software. The hardware or the software includes one or more modules corresponding to the functions.

According to a seventh aspect, this application provides an MDBV determining apparatus, including a processor and a memory. The memory is configured to store computer-executable instructions. When the apparatus runs, the processor executes the computer-executable instructions stored in the memory, to enable the apparatus to perform the methods according to the foregoing aspects.

According to an eighth aspect, this application provides an MDBV determining apparatus, including units or means configured to perform the steps in the foregoing aspects.

According to a ninth aspect, this application provides an MDBV determining apparatus, including a processor and an interface circuit. The processor is configured to: communicate with another apparatus through the interface circuit, and perform the methods according to the foregoing aspects. There are one or more processors.

According to a tenth aspect, this application provides an MDBV determining apparatus. The apparatus includes a processor, configured to be connected to a memory and invoke a program stored in the memory, to perform the methods according to the foregoing aspects. The memory may be located inside the apparatus, or may be located outside the apparatus. In addition, there are one or more processors.

According to an eleventh aspect, this application further provides a computer-readable storage medium. The computer-readable storage medium stores instructions. When the instructions are run on a computer, a processor is enabled to perform the methods according to the foregoing aspects.

According to a twelfth aspect, this application further provides a computer program product including instructions. When the computer program product runs on a computer, the computer is enabled to perform the methods according to the foregoing aspects.

According to a thirteenth aspect, this application further provides a chip system. The chip system includes a processor, configured to perform the methods according to the foregoing aspects.

According to a fourteenth aspect, this application provides an MDBV determining method. The method includes:

A session management network element sends an updated segment packet delay budget to a policy control network element;

the policy control network element obtains the updated segment packet delay budget and service feature information; and the policy control network element determines an updated MDBV based on the updated segment packet delay budget and the service feature information.

According to a fifteenth aspect, this application provides an MDBV determining method. The method includes:

An application function network element obtains an updated segment packet delay budget and service feature information;

the application function network element determines an updated MDBV based on the updated segment packet delay budget and the service feature information;

the application function network element sends the updated MDBV to a policy control network element; and the policy control network element receives the updated MDBV from the application function network element.

According to a sixteenth aspect, this application provides an MDBV determining method. The method includes:

A policy control network element sends an original MDBV to a session management network element;

the session management network element obtains an updated segment packet delay budget and the original MDBV; and the session management network element determines an updated MDBV based on the updated segment packet delay budget and the original MDBV.

According to a seventeenth aspect, this application provides an MDBV determining method. The method includes:

A session management network element obtains an updated segment packet delay budget and an original MDBV;

the session management network element determines an updated MDBV based on the updated segment packet delay budget and the original MDBV;

the session management network element generates a QoS profile based on the updated MDBV;

the session management network element sends the QoS profile to an access network device; and the access network device receives the QoS profile from the session management network element.

According to an eighteenth aspect, this application provides an MDBV determining method. The method includes:

A session management network element sends an original MDBV to an access network device;

the access network device obtains an updated segment packet delay budget and the original MDBV; and the access network device determines an updated MDBV based on the updated segment packet delay budget and the original MDBV.

According to a nineteenth aspect, this application provides an MDBV determining method. The method includes:

A session management network element sends an updated segment packet delay budget to a policy control network element;

the policy control network element obtains the updated segment packet delay budget; and the policy control network element determines an updated PCC rule based on the updated segment packet delay budget.

According to a twentieth aspect, this application provides an MDBV determining system. The system includes a session management network element and a policy control network element, where the session management network element is configured to send an updated segment packet delay budget to the policy control network element; and the policy control network element is configured to: obtain the updated segment packet delay budget and service feature information, and determine an updated MDBV based on the updated segment packet delay budget and the service feature information.

In an embodiment, that the policy control network element is configured to obtain the updated segment packet delay budget specifically includes:

The policy control network element is configured to: send a request message to the session management network element, where the request message is used to request to subscribe to the updated segment packet delay budget; and receive the updated segment packet delay budget from the session management network element.

According to a twenty-first aspect, this application provides an MDBV determining system. The system includes an application function network element and a policy control network element, where the application function network element is configured to: obtain an updated segment packet delay budget and service feature information, determine an updated MDBV based on the updated segment packet delay budget and the service feature information, and send the updated MDBV to the policy control network element; and the policy control network element is configured to receive the updated MDBV from the application function network element.

In an embodiment, that the application function network element is configured to obtain the updated segment packet delay budget specifically includes:

The application function network element is configured to receive the updated segment packet delay budget from the policy control network element or the session management network element.

In an embodiment, the policy control network element is further configured to send the updated MDBV to the session management network element, where the updated MDBV is used to generate a service flow QoS profile.

According to a twenty-second aspect, this application provides an MDBV determining system. The system includes a session management network element and a policy control network element, where the policy control network element is configured to send an original MDBV to the session management network element; and the session management network element is configured to: obtain an updated segment packet delay budget and the original MDBV, and determine an updated MDBV based on the updated segment packet delay budget and the original MDBV.

In an embodiment, the session management network element is further configured to obtain the original MDBV.

That the session management network element is configured to determine the updated MDBV based on the updated segment packet delay budget and the original MDBV specifically includes:

The session management network element is configured to determine the updated MDBV based on the updated segment packet delay budget, the original packet delay budget, and the original MDBV.

In an embodiment, the session management network element is further configured to: generate a service flow QoS profile based on the updated MDBV, and send the QoS profile to an access network device.

According to a twenty-third aspect, this application provides an MDBV determining system. The system includes a session management network element and an access network device, where the session management network element is configured to: obtain an updated segment packet delay budget and an original MDBV, determine an updated MDBV based on the updated segment packet delay budget and the original MDBV, generate a QoS profile based on the updated MDBV, and send the QoS profile to the access network device; and the access network device is configured to receive the QoS profile from the session management network element.

In an embodiment, the session management network element is further configured to obtain the original MDBV.

That the session management network element is configured to determine the updated MDBV based on the updated segment packet delay budget and the original MDBV specifically includes:

The session management network element is configured to determine the updated MDBV based on the updated segment packet delay budget, the original packet delay budget, and the original MDBV.

According to a twenty-fourth aspect, this application provides an MDBV determining system. The system includes a session management network element and an access network device, where the session management network element is configured to send an original MDBV to the access network device; and the access network device is configured to: obtain an updated segment packet delay budget and the original MDBV, and determine an updated MDBV based on the updated segment packet delay budget and the original MDBV.

In an embodiment, that the session management network element is configured to send an original MDBV to the access network device specifically includes:

The session management network element is configured to send a QoS profile to the access network device, where the QoS profile includes the original MDBV.

According to a twenty-fifth aspect, this application provides an MDBV determining system. The system includes a policy control network element and a session management network element, where the session management network element is configured to send an updated segment packet delay budget to the policy control network element; and the policy control network element is configured to: obtain the updated segment packet delay budget, and determine an updated PCC rule based on the updated segment packet delay budget.

In an embodiment, the updated PCC rule includes an updated MDBV.

In an embodiment, the policy control network element is further configured to obtain service feature information.

That the policy control network element is configured to determine the updated MDBV based on the updated segment packet delay budget specifically includes:

The policy control network element is configured to determine the updated MDBV based on the updated segment packet delay budget and the service feature information.

In an embodiment, that the policy control network element is configured to obtain the service feature information specifically includes:

The policy control network element is configured to receive the service feature information from an application function network element.

In an embodiment, the policy control network element is further configured to send the updated MDBV to the session management network element, where the updated MDBV is used to generate a service flow QoS profile.

In an embodiment, that the policy control network element is configured to obtain the updated segment packet delay budget specifically includes:

The policy control network element sends a request message to the session management network element, where the request message is used to request to subscribe to the updated segment packet delay budget; and receives the updated segment packet delay budget from the session management network element.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 1A:
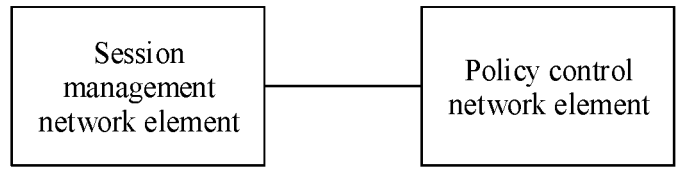
FIG. 1A is a schematic diagram of an MDBV determining system according to this application.

To resolve the problem mentioned in the background, as shown in FIG. 1A, this application provides a schematic diagram of an MDBV determining system. The system includes a session management network element and a policy control network element.

In the first embodiment, the session management network element is configured to send an updated segment packet delay budget to the policy control network element. The policy control network element is configured to: obtain the updated segment packet delay budget and service feature information, and determine an updated MDBV based on the updated segment packet delay budget and the service feature information.

In an embodiment, that the policy control network element is configured to obtain the updated segment packet delay budget specifically includes:

The policy control network element is configured to: send a request message to the session management network element, where the request message is used to request to subscribe to the updated segment packet delay budget; and receive the updated segment packet delay budget from the session management network element.

In an embodiment, that the policy control network element is configured to obtain the service feature information specifically includes:

The policy control network element is configured to receive the service feature information from an application function network element.

In an embodiment, the policy control network element is further configured to send the updated MDBV to the session management network element.

The session management network element is further configured to: generate a service flow QoS profile based on the updated MDBV, and send the QoS profile to an access network device.

In the second embodiment, the session management network element is configured to send an updated segment packet delay budget to the policy control network element. The policy control network element is configured to: obtain the updated segment packet delay budget, and determine an updated PCC rule based on the updated segment packet delay budget.

In an embodiment, the updated PCC rule includes an updated MDBV.

In an embodiment, the policy control network element is further configured to obtain service feature information.

That the policy control network element is configured to determine the updated MDBV based on the updated segment packet delay budget specifically includes:

The policy control network element is configured to determine the updated MDBV based on the updated segment packet delay budget and the service feature information.

In an embodiment, that the policy control network element is configured to obtain the service feature information specifically includes:

The policy control network element is configured to receive the service feature information from an application function network element.

In an embodiment, the policy control network element is further configured to send the updated MDBV to the session management network element, where the updated MDBV is used to generate a service flow QoS profile.

In an embodiment, that the policy control network element is configured to obtain the updated segment packet delay budget specifically includes:

The policy control network element sends a request message to the session management network element, where the request message is used to request to subscribe to the updated segment packet delay budget; and receives the updated segment packet delay budget from the session management network element.

In the third embodiment, the policy control network element is configured to send an original MDBV to the session management network element. The session management network element is configured to: obtain an updated segment packet delay budget and the original MDBV, and determine an updated MDBV based on the updated segment packet delay budget and the original MDBV.

In an embodiment, the session management network element is further configured to obtain the original MDBV.

That the session management network element is configured to determine the updated MDBV based on the updated segment packet delay budget and the original MDBV specifically includes:

The session management network element is configured to determine the updated MDBV based on the updated segment packet delay budget, the original packet delay budget, and the original MDBV.

In an embodiment, the session management network element is further configured to: generate a service flow QoS profile based on the updated MDBV, and send the QoS profile to an access network device.

Figure 1B:
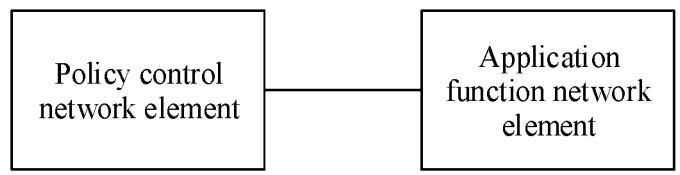
FIG. 1B is another schematic diagram of an MDBV determining system according to this application.

To resolve the problem mentioned in the background, as shown in FIG. 1B, this application provides another schematic diagram of an MDBV determining system. The system includes a policy control network element and an application function network element.

In an embodiment, the application function network element is configured to: obtain an updated segment packet delay budget and service feature information, determine an updated MDBV based on the updated segment packet delay budget and the service feature information, and send the updated MDBV to the policy control network element. The policy control network element is configured to receive the updated MDBV from the application function network element.

In an embodiment, that the application function network element is configured to obtain the updated segment packet delay budget specifically includes:

The application function network element is configured to receive the updated segment packet delay budget from the policy control network element or a session management network element.

In an embodiment, the policy control network element is further configured to send the updated MDBV to the session management network element, where the updated MDBV is used to generate a service flow QoS profile.

Figure 1C:
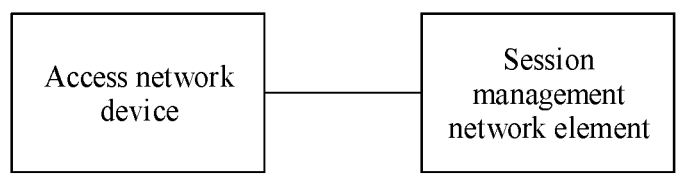
FIG. 1C is still another schematic diagram of an MDBV determining system according to this application.

To resolve the problem mentioned in the background, as shown in FIG. 1C, this application provides still another schematic diagram of an MDBV determining system. The system includes an access network device and a session management network element.

In the first embodiment, the session management network element is configured to: obtain an updated segment packet delay budget and an original MDBV, determine an updated MDBV based on the updated segment packet delay budget and the original MDBV, generate a QoS profile based on the updated MDBV, and send the QoS profile to the access network device. The access network device is configured to receive the QoS profile from the session management network element.

In an embodiment, the session management network element is further configured to obtain the original MDBV.

That the session management network element is configured to determine the updated MDBV based on the updated segment packet delay budget and the original MDBV specifically includes:

The session management network element is configured to determine the updated MDBV based on the updated segment packet delay budget, the original packet delay budget, and the original MDBV.

In the second embodiment, the session management network element is configured to send an original MDBV to the access network device.

The access network device is configured to: obtain an updated segment packet delay budget and the original MDBV, and determine an updated MDBV based on the updated segment packet delay budget and the original MDBV.

In an embodiment, that the session management network element is configured to send an original MDBV to the access network device specifically includes:

The session management network element is configured to send a QoS profile to the access network device, where the QoS profile includes the original MDBV.

Figure 2A:
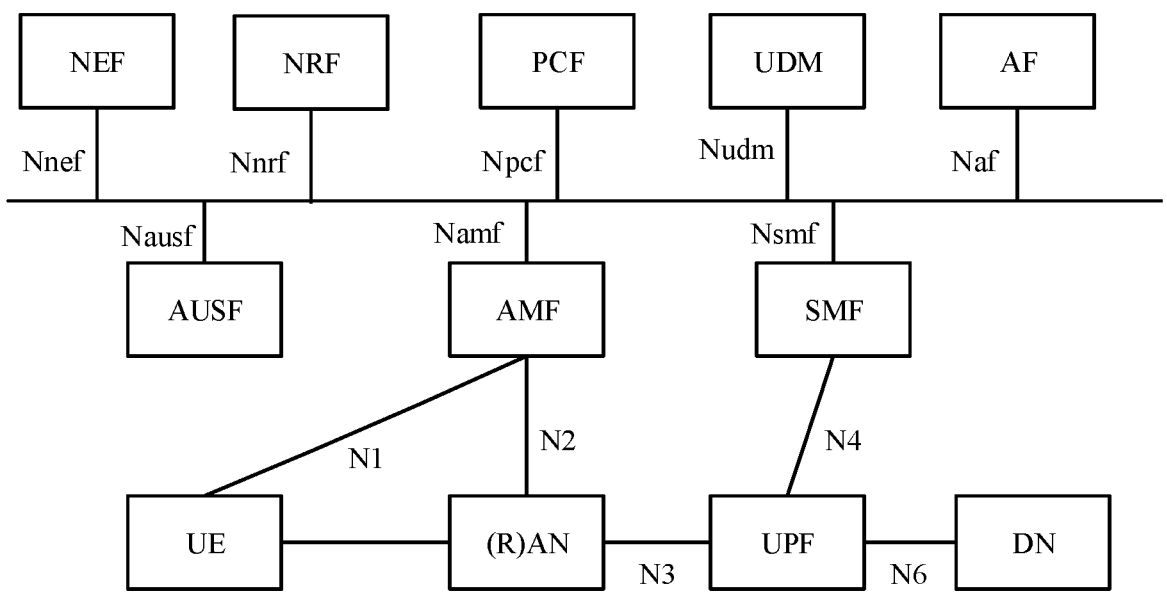
FIG. 2A is a schematic diagram of a 5G network architecture based on a service-oriented architecture.

FIG. 2A is a schematic diagram of a 5G network architecture based on a service-oriented architecture. The 5G network architecture shown in FIG. 2A may include three parts: a terminal device, a data network (DN), and a carrier network. The following describes functions of some network elements.

The carrier network may include one or more of the following network elements: a network exposure function (NEF) network element, a policy control function (PCF) network element, a unified data management (UDM) network element, a network repository function (NRF) network element, an application function (AF) network element, an authentication server function (AUSF) network element, an access and mobility management function (AMF) network element, a session management function (session management function, SMF) network element, a (radio) access network ((R)AN), a user plane function (UPF) network element, and the like. In the foregoing carrier network, parts other than the (radio) access network may be referred to as core network parts. For ease of description, an example in which the (R)AN is referred to as a RAN is used below for description.

The terminal device (which may also be referred to as user equipment (UE)) is a device that has a wireless transceiver function, and may be deployed on land, for example, an indoor device, an outdoor device, a handheld device, or a vehicle-mounted device; or may be deployed on water (for example, on a steamship); or may be deployed in the air (for example, on an airplane, a balloon, or a satellite). The terminal device may be a mobile phone), a tablet computer (pad), a computer that has a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

The terminal device may establish a connection to the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service to the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node of the carrier network through the RAN. A RAN device in this application is a device that provides a wireless communication function to a terminal device, and the RAN device is also referred to as an access network device. The RAN device in this application includes but is not limited to: a next generation base station (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, and the like.

The AMF network element is a control plane network element provided by the carrier network, and is responsible for access control and mobility management when the terminal device accesses the carrier network, for example, including functions such as mobility status management, allocation of a temporary user identity, and user authentication and authorization.

The SMF network element is a control plane network element provided by the carrier network, and is responsible for managing a protocol data unit (PDU) session of the terminal device. The PDU session is a channel used to transmit a PDU, and the terminal device and the DN needs to send a PDU to each other via the PDU session. The SMF network element is responsible for establishment, maintenance, deletion, and the like of the PDU session. The SMF network element includes session-related functions such as session management (for example, session establishment, modification, and release, including tunnel maintenance between the UPF and the AN), selection and control of the UPF network element, service and session continuity (SSC) mode selection, and roaming.

The UPF network element is a gateway provided by a carrier, and is a gateway for communication between the carrier network and the DN. The UPF network element includes user plane-related functions such as packet routing and transmission, packet detection, service usage reporting, quality of service (QoS) processing, lawful interception, uplink packet detection, and downlink packet storage.

The DN may also be referred to as a packet data network (PDN), and is a network located outside the carrier network. The carrier network may access a plurality of DNs, and a plurality of services may be deployed on the DNs, to provide services such as a data service and/or a voice service to the terminal device. For example, the DN is a private network of a smart factory, a sensor installed in a workshop of the smart factory may be a terminal device, a control server of the sensor is deployed in the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the carrier, and is responsible for storing information such as a subscription permanent identifier (SUPI), a credential, a security context, and subscription data of a subscriber in the carrier network. The information stored in the UDM network element may be used for authentication and authorization when the terminal device accesses the carrier network. The subscriber in the carrier network may be specifically a subscriber using a service provided by the carrier network, for example, a subscriber using a SIM card of China Telecom, or a subscriber using a SIM card of China Mobile. The subscription permanent identifier (SUPI) of the subscriber may be a number of the SIM card or the like. The credential and the security context of the subscriber may be stored small files such as an encryption key of the SIM card or information related to encryption of the SIM card, and are used for authentication and/or authorization. The security context may be cookie, a token, or the like stored in a local terminal (for example, a mobile phone) of the subscriber. The subscription data of the subscriber may be a supporting service of the SIM card, for example, a data package or available data of the SIM card. It should be noted that the permanent identifier, the credential, the security context, authentication cookie, and the token are equivalent to information related to authentication and authorization, and are not limited or distinguished between each other for ease of description in this application document of the present invention. Unless otherwise specified, the security context is used as an example for description in this embodiment of this application. However, this embodiment of this application is also applicable to authentication and/or authorization information described in another manner.

The AUSF network element is a control plane network element provided by the carrier, and may be generally used for level-1 authentication, that is, authentication between the terminal device (the subscriber) and the carrier network. After receiving an authentication request initiated by the subscriber, the AUSF network element may perform authentication and/or authorization on the subscriber by using authentication information and/or authorization information stored in the UDM network element, or generate authentication and/or authorization information of the subscriber by using the UDM network element. The AUSF network element may feed back the authentication information and/or authorization information to the subscriber.

The NEF network element is a control plane network element provided by the carrier. The NEF network element securely exposes an external interface of the carrier network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF sends the SUPI of the subscriber from the carrier network to the third party, the NEF may translate the SUPI into an external identity (ID) corresponding to the SUPI. When the NEF network element sends the external ID (an ID of the third-party network element) to the carrier network, the NEF network element may translate the external ID into the SUPI.

The application function (AF) network element mainly provides an application layer service, and further supports interaction with a 5G core network to provide a service, for example, affecting a data routing decision and a policy control function, or providing some third-party services to a network side. In specific application, the AF network element is generally a third-party server.

The PCF network element is a control plane function provided by the carrier, and is configured to provide a policy to a network element. In an implementation, the policy may include an access control policy, a mobility management policy, a charging-related policy, a QoS-related policy, an authorization-related policy, and the like.

The NRF network element may be configured to provide a network element discovery function, and provide, based on a request of another network element, network element information corresponding to a network element type, for example, address information and/or identification information. The NRF further provides a network element management service, for example, registration, update, and deregistration of a network element and subscription and push of a network element status.

In FIG. 2A, Nnef, Nausf, Npcf, Nudm, Naf, Namf, Nsmf, N1, N2, N3, N4, and N6 are interface serial numbers. For meanings of these interface serial numbers, refer to meanings defined in the 3GPP standard protocol. This is not limited herein.

Figure 2B:
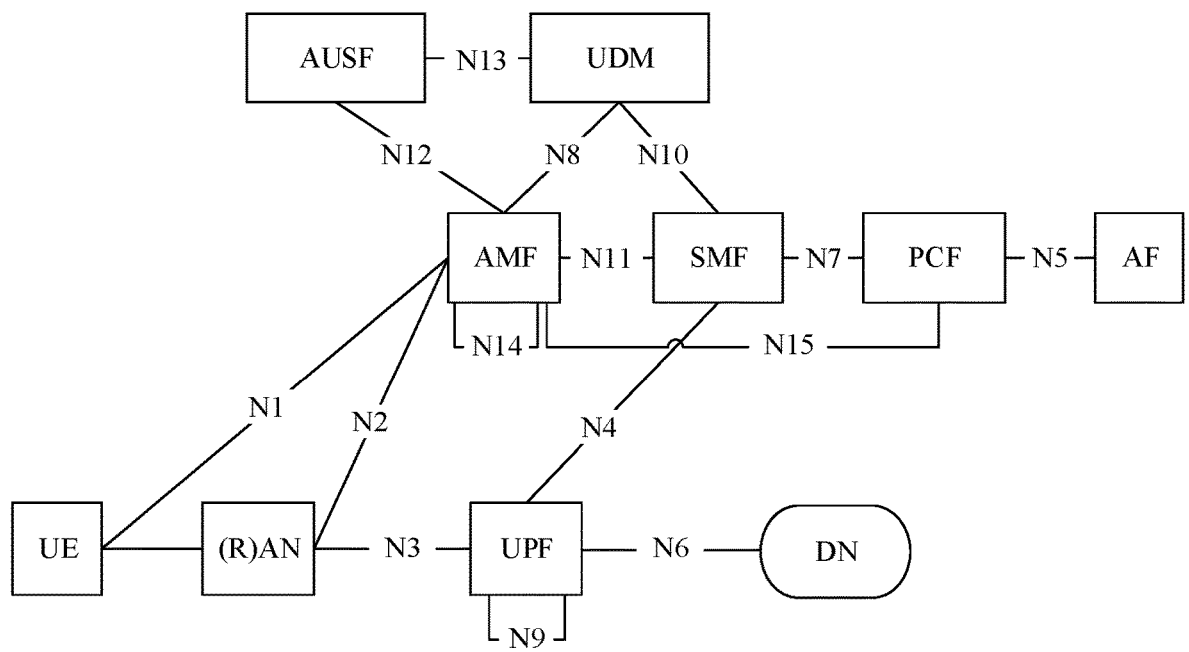
FIG. 2B is a schematic diagram of a 5G network architecture based on a point-to-point interface.

FIG. 2B is a schematic diagram of a 5G network architecture based on a point-to-point interface. For descriptions of functions of network elements, refer to descriptions of functions of corresponding network elements in FIG. 2A. Details are not described again. A main difference between FIG. 2B and FIG. 2A lies in that interfaces between network elements in FIG. 2B are point-to-point interfaces rather than service-oriented interfaces.

In the architecture shown in FIG. 2B, an interface between the UE and the AMF network element is referred to as an N1 interface. An interface between the AMF network element and the RAN device is referred to as an N2 interface. An interface between the RAN device and the UPF network element may be referred to as an N3 interface. An interface between the SMF network element and the UPF network element is referred to as an N4 interface. An interface between the PCF network element and the AF network element is referred to as an N5 interface. An interface between the UPF network element and the DN is referred to as an N6 interface. An interface between the SMF network element and the PCF network element is referred to as an N7 interface. An interface between the AMF network element and the UDM network element is referred to as an N8 interface. An interface between different UPF network elements is referred to as an N9 interface. An interface between the UDM network element and the SMF network element is referred to as an N10 interface. An interface between the AMF network element and the SMF network element is referred to as an N11 interface. An interface between the AUSF network element and the AMF network element is referred to as an N12 interface. An interface between the AUSF network element and the UDM network element is referred to as an N13 interface. An interface between different AMF network elements is referred to as an N14 interface. An interface between the AMF network element and the PCF network element is referred to as an N15 interface.

It may be understood that the foregoing network elements or functions may be network elements in a hardware device, may be software functions running on dedicated hardware, or may be virtualized functions instantiated on a platform (for example, a cloud platform). Optionally, the foregoing network elements or functions may be implemented by one device, or may be jointly implemented by a plurality of devices, or may be one function module in one device. This is not specifically limited in the embodiments of this application.

The session management network element, the policy control network element, the application function network element, and the access network device in this application may respectively be the SMF, the PCF, the AF, or the RAN in FIG. 2A or FIG. 2B, or may be network elements that have functions of the SMF, the PCF, the AF, and the RAN in future communication such as a 6th generation (6G). This is not limited in the embodiments of this application. For ease of description, in this application, an example in which the session management network element, the policy control network element, the application function network element, and the access network device are respectively the SMF, the PCF, the AF, and the RAN is used for description.

It should be noted that a first device in this application is a general term of a plurality of types of network elements. In different embodiments, the first device may be the AF, the SMF, the RAN, the PCF, or the terminal device. Details are described below.

In a 5G system, to ensure end-to-end quality of service of a service, a 5G QoS model based on QoS flows is proposed. The 5G QoS model supports a GBR QoS flow (GBR QoS flow) and a non-guaranteed bit rate QoS flow (Non-GBR QoS flow). Same transmission processing (such as scheduling or an admission threshold) is performed on packets controlled by a same QoS flow.

A terminal device may establish one or more protocol data unit (protocol data unit, PDU) sessions with a 5G network. One or more QoS flows may be established in each PDU session. Each QoS flow is identified by a QoS flow identifier (QFI), and the QFI uniquely identifies a QoS flow in a session.

Whether a QoS flow is a GBR QoS flow or a GBR QoS flow is determined by a corresponding QoS profile (QoS profile).

Currently, a QoS flow establishment and update procedure is as follows:

1. When an SMF determines, based on a local policy or a PCC rule sent by a PCF, to establish and update a QoS flow,
    (1) the SMF sends service data flow (SDF) information to a UPF, where the information includes QoS control information;
    (2) the SMF sends a QoS profile (QoS profile) of the QoS flow to a RAN by using an AMF;
    (3) the SMF sends a QoS rule (QoS rule) to a terminal device by using the AMF and the RAN, where the QoS rule includes the QoS control information.
2. QoS flow establishment and update are performed between the terminal device, the RAN, and the UPF. The RAN establishes a data radio bearer (DRB) of an air interface based on the QoS profile, and stores a binding relationship between the QoS flow and the DBR.

(1) Downlink direction: When receiving a downlink data packet, the UPF performs QoS control based on the SDF information sent by the SMF, and includes a QFI in a data packet header. When receiving the downlink data packet, the RAN places, based on the QFI in the packet header and a binding relationship between a corresponding QoS flow and the DRB, the data packet over a corresponding DRB for transmission.

(2) Uplink direction: When determining to send an uplink data packet, the terminal device determines the QoS flow based on the QoS rule, includes a QFI in a packet header, and places, based on the binding relationship between the QoS flow and the DBR, the data packet over a corresponding DRB for transmission. When receiving the uplink data packet, the RAN includes the QFI in a data packet header between the RAN and the UPF based on the QFI in the packet header. When receiving the data packet sent by the RAN, the UPF verifies whether the data packet is transmitted by using a correct QoS flow.

To resolve the problem mentioned in the background, this application provides an MDBV determining method. The method is performed by a first device (which may be a PCF, an AF, an SMF, a RAN, or a terminal device). The method includes: The first device obtains an updated segment PDB and service feature information, and the first device determines an updated MDBV based on the updated segment PDB and the service feature information.

A segment PDB herein may be an AN PDB or a CN PDB. Therefore, the updated segment PDB may be an updated AN PDB or an updated CN PDB. The updated segment PDB may also be referred to as an actually used segment PDB, a changed segment PDB, a correct segment PDB, or the like. The updated segment PDB indicates a segment PDB actually used by the RAN. A value of the segment PDB may be different from that of a configured segment PDB. Alternatively, it is understood that the RAN initially uses the configured segment PDB, and subsequently the RAN or the SMF updates the segment PDB based on an actual situation, so that the updated segment PDB is actually used. In addition, according to a current technology, the PCF is not aware of the updated segment PDB.

The service feature information includes one or more of the following: a burst size (burst size), a service periodicity, a burst arrival time, a packet arrival time, and a packet size, where the burst size is used to indicate a data volume in one service periodicity.

It should be noted that, in the foregoing solution, if the updated segment PDB obtained by the first device is the AN PDB, the first device may directly determine the updated MDBV based on the AN PDB. If the updated segment PDB obtained by the device is the CN PDB, the first device may first determine the AN PDB based on the CN PDB and an E2E PDB, and then determine the updated MDBV based on the AN PDB.

Based on the foregoing method, the first device determines the updated MDBV based on the updated segment PDB, so that the RAN can use the updated MDBV. Therefore, according to an actual requirement of the RAN, a corresponding MDBV is generated for use. This helps ensure communication efficiency of the RAN.

In an implementation method, for example, that the first device determines an updated MDBV based on the updated segment PDB and the service feature information may be as follows:

(1) When the service periodicity (T) is less than or equal to the updated AN PDB, Updated MDBV=Burst size× (Updated AN PDBAN PDB/T).

(2) When the service periodicity (T) is greater than the updated AN PDB, the updated MDBV may be determined based on the packet arrival time and the packet size. It should be noted that, for an aperiodic service, the service periodicity may be considered infinite.

Figure 3:
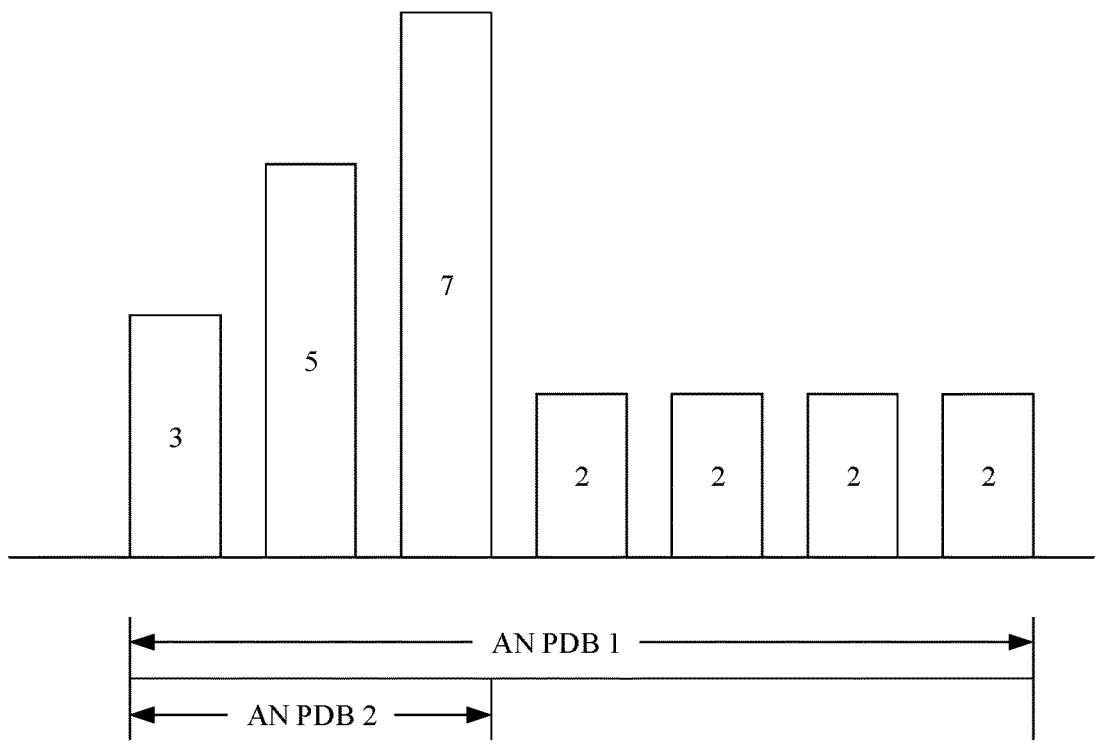
FIG. 3 is a schematic diagram of a segment of a service in which a maximum volume of data is intercepted by using an AN PDB as a time window.

For example, FIG. 3 is a schematic diagram of a segment of a service in which a maximum volume of data is intercepted by using an AN PDB as a time window. The AN PDB is used as an example. In the first example, an updated AN PDB (an AN PDB 1 in the figure) includes seven data packets. During scheduling of a RAN, an MDBV is used to set a size of a token bucket. Data packets are not discarded unless a delay is greater than the AN PDB. Therefore, a data packet whose size is "3" may still be in the token bucket when the last data packet whose size is "2" arrives. This means that the size of the bucket is 3+5+7+2+2+2+2=23, that is, Updated MDBV=23. In the second example, an updated AN PDB (an AN PDB 2 in the figure) includes three data packets. A packet whose size is "3" in a token bucket may still be in the token bucket when a data packet whose size is 7 arrives, and then will be definitely discarded. Therefore, the size of the token bucket can only be 3+5+7=19, that is, Updated MDBV=19.

The following provides specific descriptions by using an example in which the first device is a PCF or an AF.

Figure 4:
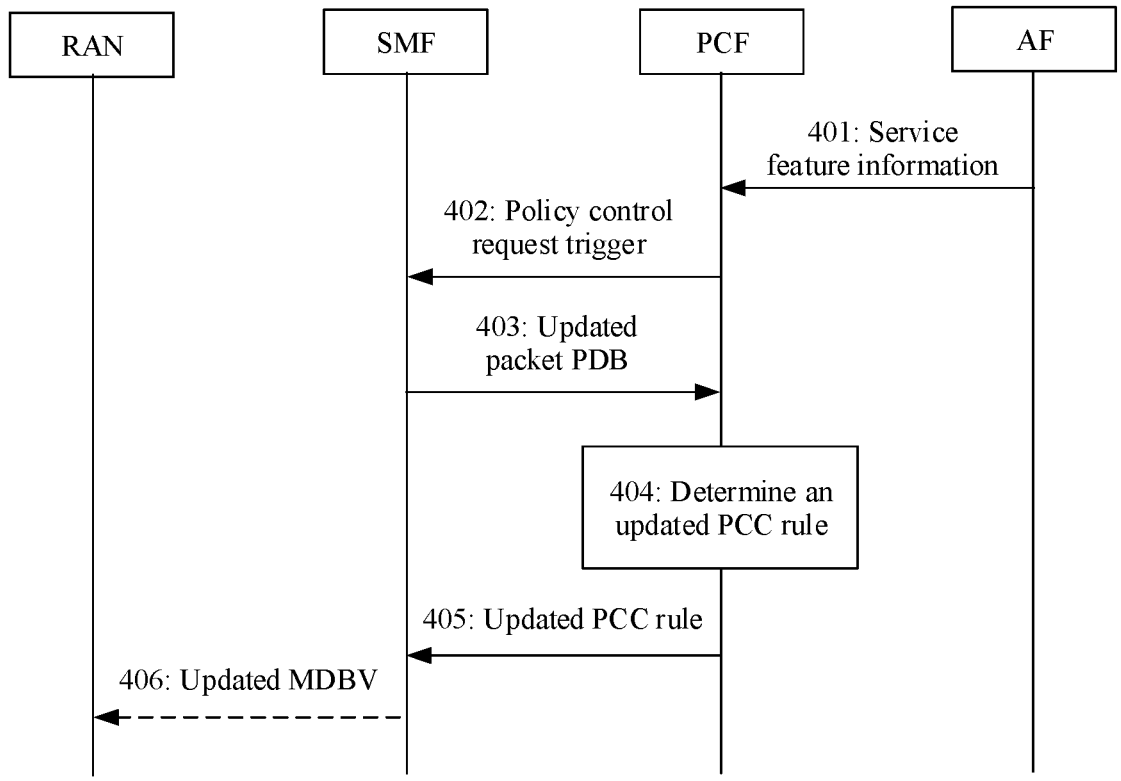
FIG. 4 is a schematic diagram of an MDBV determining method according to this application.

FIG. 4 is a schematic diagram of an MDBV determining method according to an embodiment of this application. In this embodiment, the first device is a PCF. To be specific, the PCF determines an updated MDBV. As shown in FIG. 4, the method includes the following steps.

Step 401: An AF sends service feature information to the PCF.

For example, the AF may actively send the service feature information to the PCF, or the PCF may actively obtain the service feature information from the AF. For specific content of the feature information herein, refer to the foregoing descriptions.

Step 402: The PCF sends a policy control request trigger (PCR Trigger) to an SMF, that is, the PCF may subscribe to a change of a CN PDB or an AN PDB by using the PCR trigger (where a granularity may be a QoS flow, a service data flow (SDF), or a 5QI).

Triggering conditions of the PCR trigger include but are not limited to the followings:

(1) A segment PDB of a QoS flow changes. To be specific, when the segment PDB of the QoS flow changes, the SMF is triggered to report an updated segment PDB to the PCF.

(2) A segment PDB of a 5QI changes. To be specific, when the segment PDB of the 5QI changes, the SMF is triggered to report an updated segment PDB to the PCF.

(3) A segment PDB of an SDF changes. To be specific, when the segment PDB of the SDF changes, the SMF is triggered to report an updated segment PDB to the PCF.

In another implementation method, the PCF may further send a request message to the SMF, where the request message is used to request to subscribe to an updated segment PDB.

Step 403: The SMF sends the updated segment PDB to the PCF.

In an embodiment, this step may be specifically implemented as follows: The SMF sends a PDB Npcf_SMPolicyControl_Update request to the PCF, where the PDB Npcf_SMPolicyControl_Update request carries the updated segment PDB.

Step 404: The PCF makes a policy decision based on the updated segment PDB and the service feature information, and generates an updated PCC rule.

The PCC rule includes an updated MDBV. This may also be understood as that the PCF generates the updated PCC rule based on the updated packet PDB, that is, the PCF determines the updated MDBV based on the updated packet PDB, and then generates the updated PCC rule based on the updated MDBV. An implementation method in which the PCF determines the updated MDBV based on the updated packet PDB is as follows: The PCF determines the updated MDBV based on the updated packet PDB and the service feature information.

Certainly, in another implementation, the PCF may alternatively determine the updated MDBV based on the updated packet PDB and other information (for example, an original MDBV described in the following embodiments). For details, refer to the following descriptions.

For a specific implementation process of this step, refer to the foregoing descriptions.

Step 405: The PCF sends the updated PCC rule to the SMF, where the updated PCC rule includes the updated MDBV.

In an embodiment, this step may be specifically implemented as follows: The PCF sends an Npcf_SMPolicyControl_Update response to the SMF, where the Npcf_SMPolicyControl_Update response carries the updated segment PDB, a new PCC rule, or a modified PCC rule.

Optionally, the following step 406 may be further included.

Step 406: The SMF sends the updated MDBV to a RAN.

In an implementation, the SMF may generate a QoS profile (QoS profile) based on the updated MDBV, where the QoS profile includes the updated MDBV.

Optionally, the SMF may further generate a QoS rule (QoS rule) based on the updated MDBV, where the QoS rule includes the updated MDBV, and then the SMF sends the QoS rule to a terminal device.

Based on the embodiment in FIG. 4, the SMF reports a change of the segment PDB to the PCF, so that the PCF is aware of a current segment PDB, to generate a correct MDBV, and send the correct MDBV to the RAN and/or the terminal device.

Figure 5:
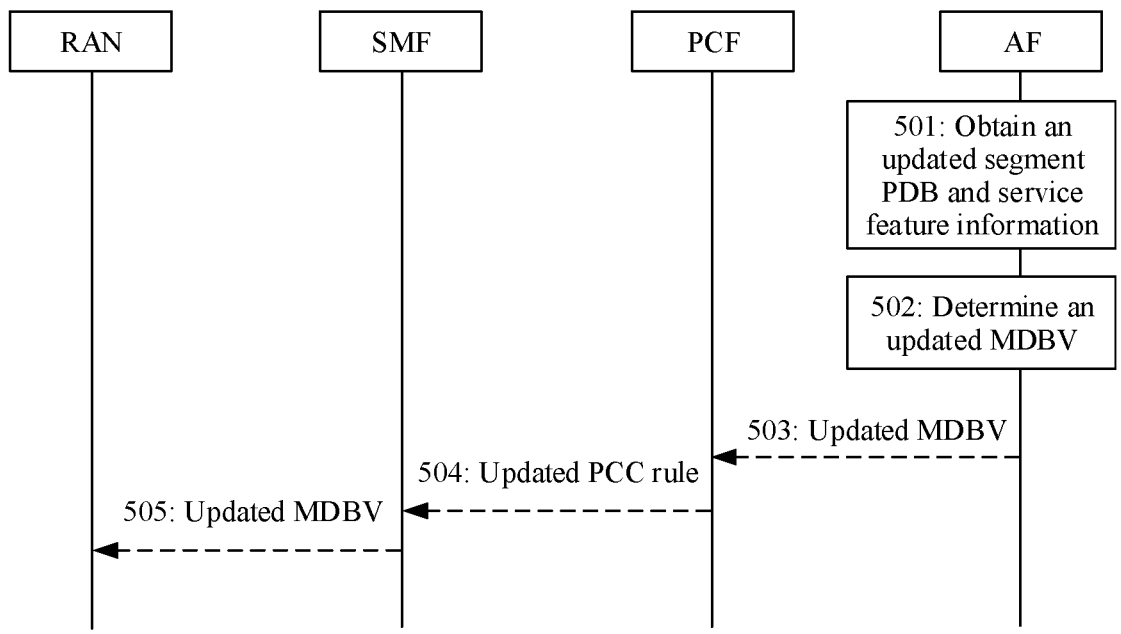
FIG. 5 is another schematic diagram of an MDBV determining method according to this application.

FIG. 5 is another schematic diagram of an MDBV determining method according to an embodiment of this application. In this embodiment, the first device is an AF. To be specific, the AF determines an updated MDBV and sends the updated MDBV to a PCF, and the PCF generates an updated PCC rule based on the updated MDBV, where the PCC rule may include the updated MDBV. Optionally, the AF may further send other related service information such as service feature information (for example, a burst size, a service periodicity, a burst arrival time, a packet arrival time, or a packet size) to the PCF, and the PCG may generate the updated PCC rule based on the updated MDBV and the other related service information.

As shown in FIG. 5, the method includes the following steps.

Step 501: The AF obtains an updated packet PDB and service feature information.

For example, after obtaining the updated packet PDB, an SMF may directly send the updated packet PDB to the AF, or the SMF sends the updated packet PDB to the PCF, and then the PCF sends the updated packet PDB to the AF.

The AF can locally obtain the service feature information.

Step 502: The AF determines an updated MDBV based on the updated packet PDB and the service feature information.

For a specific implementation process of this step, refer to the foregoing descriptions.

Optionally, the following step 503 to step 505 may be further included.

Step 503: The AF sends the updated MDBV to the PCF.

Step 504: The PCF sends an updated PCC rule to the SMF, where the updated PCC rule includes the updated MDBV.

Step 505: The SMF sends the updated MDBV to a RAN.

For example, the SMF generates a QoS profile based on the updated MDBV, where the QoS profile includes the updated MDBV, and then the SMF sends the QoS profile to the RAN.

Optionally, the SMF may further generate a QoS rule (QoS rule) based on the updated MDBV, where the QoS rule includes the updated MDBV, and then the SMF sends the QoS rule to a terminal device.

Based on the embodiment in FIG. 5, the SMF or the PCF reports a change of a segment PDB to the AF, so that the AF is aware of the current segment PDB, to generate a correct MDBV, and send the correct MDBV to the RAN and/or the terminal device.

To resolve the problem mentioned in the background, this application provides still another MDBV determining method. The method is performed by a first device (which may be a PCF, an AF, an SMF, a RAN, or a terminal device). The method includes: The first device obtains an updated segment PDB and an original MDBV, and the first device determines an updated MDBV based on the updated segment PDB and the original MDBV.

A meaning of a segment PDB herein is the same as that described above, and details are not described herein again.

It should be noted that, in the foregoing solution, if the updated segment PDB obtained by the first device is an AN PDB, the first device may directly determine the updated MDBV based on the AN PDB. If the updated segment PDB obtained by the device is a CN PDB, the first device may first determine the AN PDB based on the CN PDB and an E2E PDB, and then determine the updated MDBV based on the AN PDB.

Based on the foregoing method, the first device determines the updated MDBV based on the updated segment PDB, so that the RAN can use the updated MDBV. Therefore, according to an actual requirement of the RAN, a corresponding MDBV is generated for use. This helps ensure communication efficiency of the RAN.

In an implementation method, for example, that the first device determines an updated MDBV based on the updated segment PDB and the original MDBV may be as follows:

(1) The first device obtains an original segment PDB (for example, the original segment PDB may be obtained based on a configuration, that is, the RAN or the SMF has configured a value of the original segment PDB), and the first device determines the updated MDBV based on the updated segment PDB, the original segment PDB, and the original MDBV.

In an implementation, the segment PDB is the AN PDB. When a service periodicity is less than or equal to the AN PDB, Updated MDBV=(Original MDBV/Original AN PDB)×Updated AN PDB.

In another implementation, the segment PDB is the CN PDB. When a service periodicity is less than or equal to the AN PDB, Updated MDBV=(Original MDBV/(E2E PDB−Original CN PDB))×(E2E PDB−Updated CN PDB). E2E PDB−Original CN PDB=Original AN PDB, and E2E PDB−Updated CN PDB=Updated AN PDB.

(2) The first device obtains a volume of a data packet of the original MDBV (where the volume may be obtained based on a configuration), and determines, based on the updated segment PDB, a volume of a data packet that can be transmitted by the updated segment PDB. Therefore, it is determined that Updated MDBV=(Original MDBV/Volume of the data packet of the original MDBV)×Volume of the data packet that can be transmitted by the updated segment PDB.

The following provides specific descriptions by using an example in which the first device is a RAN or an SMF.

Figure 6:
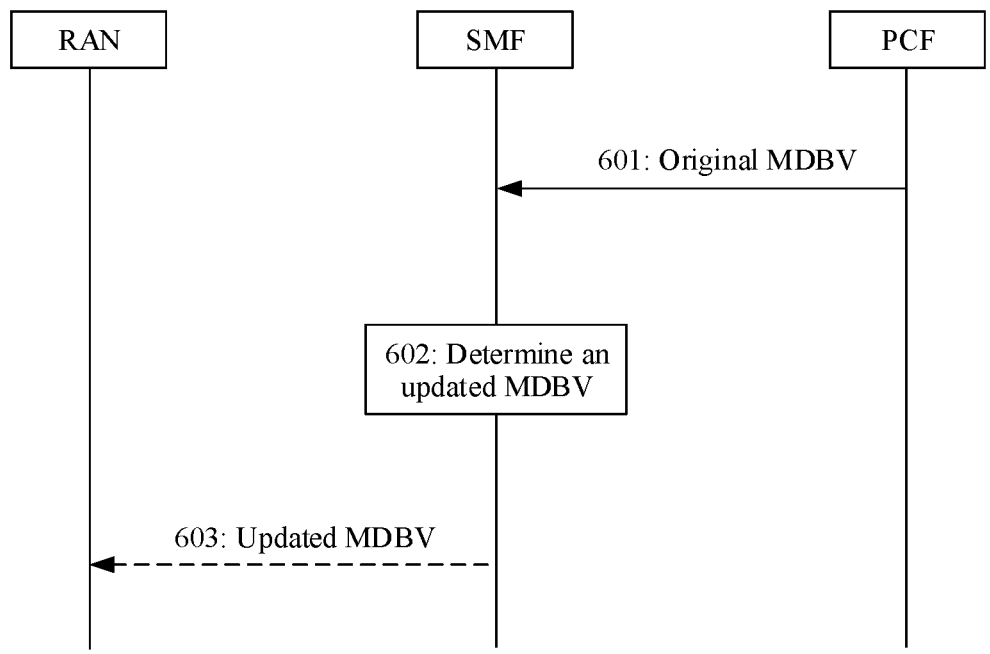
FIG. 6 is still another schematic diagram of an MDBV determining method according to this application.

FIG. 6 is still another schematic diagram of an MDBV determining method according to an embodiment of this application. In this embodiment, the first device is an SMF. To be specific, the SMF determines an updated MDBV. As shown in FIG. 6, the method includes the following steps.

Step 601: A PCF sends an original MDBV to the SMF.

For example, the PCF delivers a PCC rule to the SMF, where the PCC rule includes the original MDBV.

Step 602: The SMF determines an updated MDBV based on an updated segment PDB and the original MDBV.

For an embodiment of this step, refer to the foregoing descriptions.

Optionally, the following step 603 may be further included.

Step 603: The SMF sends the updated MDBV to a RAN.

For example, the SMF generates a QoS profile based on the updated MDBV, where the QoS profile includes the updated MDBV, and then the SMF sends the QoS profile to the RAN.

Optionally, the SMF may further generate a QoS rule (QoS rule) based on the updated MDBV, where the QoS rule includes the updated MDBV, and then the SMF sends the QoS rule to a terminal device.

Based on the embodiment in FIG. 6, the SMF generates a correct MDBV based on the updated segment PDB, and sends the correct MDBV to the RAN and/or the terminal device.

Figure 7:
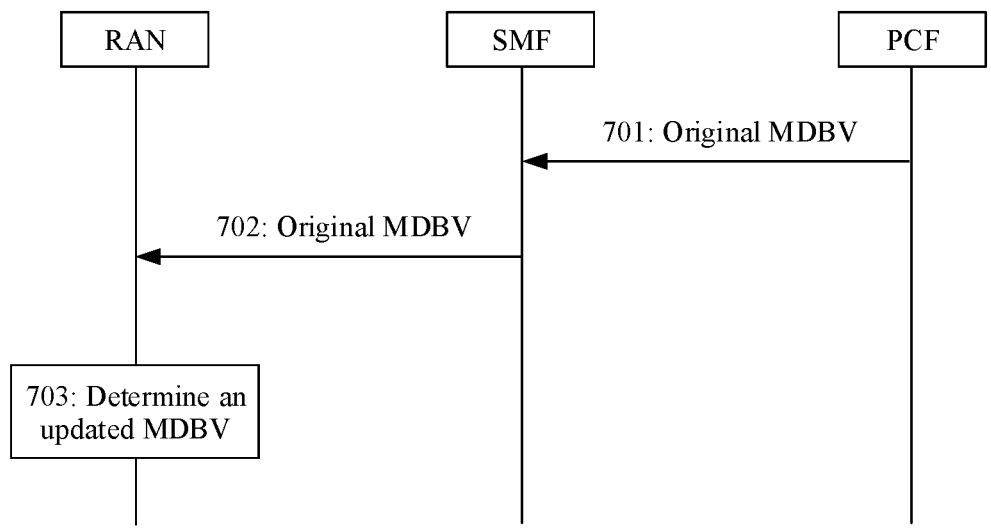
FIG. 7 is still another schematic diagram of an MDBV determining method according to this application.

FIG. 7 is still another schematic diagram of an MDBV determining method according to an embodiment of this application. In this embodiment, the first device is a RAN. To be specific, the RAN determines an updated MDBV. As shown in FIG. 7, the method includes the following steps.

Step 701: A PCF sends an original MDBV to an SMF.

For example, the PCF delivers a PCC rule to the SMF, where the PCC rule includes the original MDBV.

Step 702: The SMF sends the original MDBV to the RAN.

For example, the SMF generates a QoS profile based on the original MDBV, where the QoS profile includes the original MDBV, and then the SMF sends the QoS profile to the RAN.

Step 703: The RAN determines the updated MDBV based on an updated segment PDB and the original MDBV.

For an embodiment of this step, refer to the foregoing descriptions.

Optionally, the RAN may further send the updated MDBV to a terminal device.

Based on the embodiment in FIG. 7, the RAN generates a correct MDBV based on the updated segment PDB, and may send the correct MDBV to the terminal device.

The foregoing mainly describes the solutions provided in this application from a perspective of interaction between network elements. It may be understood that to implement the foregoing functions, each network element includes a corresponding hardware structure and/or software module for implementing each function. A person of ordinary skill in the art should easily be aware that, in combination with units and algorithm steps of examples described in the embodiments disclosed in this specification, the present invention may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

Figure 8:
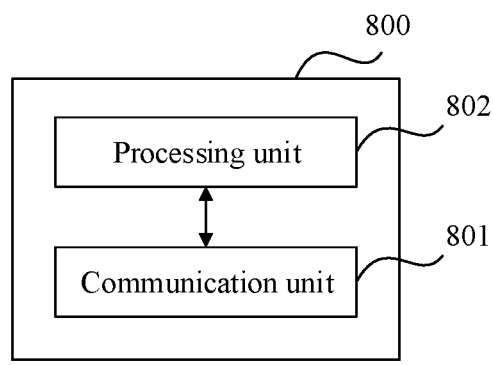
FIG. 8 is a schematic diagram of an MDBV determining apparatus according to this application.

FIG. 8 is a block diagram of a possible example of an MDBV determining apparatus in this application, and the apparatus 800 may exist in a form of software or hardware. The apparatus 800 may include a processing unit 802 and a communication unit 801. In an implementation, the communication unit 801 may include a receiving unit and a sending unit. The processing unit 802 is configured to control and manage an action of the apparatus 800. The communication unit 801 is configured to support the apparatus 800 in communicating with another network entity.

The processing unit 802 may be a processor or a controller, for example, a general-purpose central processing unit (CPU), a general-purpose processor, digital signal processor (DSP), an application-specific integrated circuit (ASIC), a field programmable gate array (FPGA), another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination including one or more microprocessors, or a combination of a DSP and a microprocessor. The communication unit 801 is an interface circuit of the apparatus, and is configured to receive a signal from another apparatus. For example, when the apparatus is implemented in a form of a chip, the communication unit 801 is an interface circuit used by the chip to receive a signal from another chip or apparatus, or is an interface circuit used by the chip to send a signal to another chip or apparatus.

The apparatus 800 may be the first device (for example, a policy control network element, a session management network element, an access network device, a terminal device, or an application function network element) in the foregoing embodiments and may also be a chip used in the first device. For example, when the apparatus 800 is the first device, the processing unit 802 may be, for example, a processor, and the communication unit 801 may be, for example, a transceiver. Optionally, the transceiver may include a radio frequency circuit, and a storage unit may be, for example, a memory. For example, when the apparatus 800 is the chip used in the first device, the processing unit 802 may be, for example, a processor, and the communication unit 801 may be, for example, an input/output interface, a pin, or a circuit. The processing unit 802 may execute computer-executable instructions stored in a storage unit. Optionally, the storage unit is a storage unit inside the chip, such as a register or a buffer. Alternatively, the storage unit may be a storage unit that is inside the first device and that is located outside the chip, such as a read-only memory (ROM), another type of static storage device that can store static information and instructions, or a random access memory (RAM).

In the first embodiment, the communication unit 801 is configured to obtain an updated segment packet delay budget and service feature information. The processing unit 802 is configured to determine an updated MDBV based on the updated segment packet delay budget and the service feature information.

In an embodiment, the service feature information includes one or more of the following: a burst size, a service periodicity, a burst arrival time, a packet arrival time, and a packet size, where the burst size is used to indicate a data volume in one service periodicity.

In an embodiment, the apparatus is a policy control network element. That the communication unit 801 is configured to obtain an updated segment packet delay budget includes: The communication unit 801 is configured to: send a request message to a session management network element, where the request message is used to request to subscribe to the updated segment packet delay budget; and receive the updated segment packet delay budget from the session management network element.

In an embodiment, that the communication unit 801 is configured to obtain service feature information includes: The communication unit 801 is configured to receive the service feature information from an application function network element.

In an embodiment, the communication unit 801 is further configured to send the updated MDBV to the session management network element, where the updated MDBV is used to generate a service flow QoS profile.

In an embodiment, the apparatus is an application function network element. That the communication unit 801 is configured to obtain an updated segment packet delay budget includes: The communication unit 801 is configured to receive the updated segment packet delay budget from a session management network element or a policy control network element.

In an embodiment, the communication unit 801 is further configured to send the updated MDBV to the policy control network element, where the updated MDBV is used to update a policy and charging control PCC rule.

In an embodiment, a segment packet delay budget is an access network segment packet delay budget or a core network segment packet delay budget.

In the second embodiment, the communication unit 801 is configured to obtain an updated segment packet delay budget and an original MDBV. The processing unit 802 is configured to determine an updated MDBV based on the updated segment packet delay budget and the original MDBV.

In an embodiment, the communication unit 801 is further configured to obtain an original packet delay budget. That the processing unit 802 is configured to determine an updated MDBV based on the updated segment packet delay budget and the original MDBV includes: The processing unit 802 is configured to determine the updated MDBV based on the updated segment packet delay budget, the original packet delay budget, and the original MDBV.

In an embodiment, the apparatus is a session management network element. The processing unit 802 is further configured to generate a service flow QoS profile based on the updated MDBV. The communication unit 801 is further configured to send the QoS profile to an access network device.

In an embodiment, that the communication unit 801 is configured to obtain an original MDBV includes: The communication unit 801 is configured to receive a PCC rule from a policy control network element, where the PCC rule includes the original MDBV.

In an embodiment, the apparatus is an access network device. That the communication unit 801 is configured to obtain an original MDBV includes: The communication unit 801 is configured to receive a QoS profile from a session management network element, where the QoS profile includes the original MDBV.

In an embodiment, a segment packet delay budget is an access network segment packet delay budget or a core network segment packet delay budget.

In the fourth embodiment, the communication unit 801 is configured to obtain an updated segment packet delay budget. The processing unit 802 is configured to determine an updated PCC rule based on the updated segment packet delay budget.

In an embodiment, the updated PCC rule includes an updated MDBV.

In an embodiment, the communication unit 801 is further configured to obtain service feature information. That the processing unit 802 is configured to determine an updated MDBV based on the updated segment packet delay budget includes: The processing unit 802 is configured to determine the updated MDBV based on the updated segment packet delay budget and the service feature information.

In an embodiment, the service feature information includes one or more of the following: a burst size, a service periodicity, a burst arrival time, a packet arrival time, and a packet size, where the burst size is used to indicate a data volume in one service periodicity.

In an embodiment, that the communication unit 801 is configured to obtain the service feature information includes: The communication unit 801 is further configured to receive the service feature information from an application function network element.

In an embodiment, the communication unit 801 is further configured to send the updated MDBV to a session management network element, where the updated MDBV is used to generate a service flow QoS profile.

In an embodiment, that the communication unit 801 is configured to obtain an updated segment packet delay budget includes: The communication unit 801 is configured to: send a request message to the session management network element, where the request message is used to request to subscribe to the updated segment packet delay budget; and receive the updated segment packet delay budget from the session management network element.

In an embodiment, a segment packet delay budget is an access network segment packet delay budget or a core network segment packet delay budget.

It may be understood that for a specific implementation process and corresponding beneficial effects of the apparatus used in the MDBV determining method, refer to related descriptions in the foregoing method embodiments. Details are not described herein again.

Figure 9:
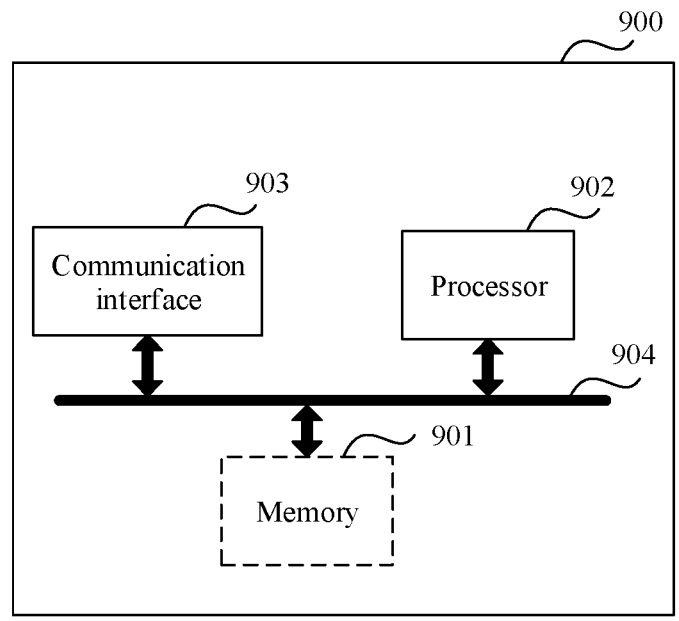
FIG. 9 is still another schematic diagram of an MDBV determining apparatus according to this application.

FIG. 9 is a schematic diagram of an MDBV determining apparatus according to this application. The apparatus may be the first device (for example, a policy control network element, a session management network element, an access network device, a terminal device, or an application function network element) in the foregoing embodiments. The apparatus 900 includes a processor 902 and a communication interface 903. Optionally, the apparatus 900 may further include a memory 901. Optionally, the apparatus 900 may further include a communication line 904. The communication interface 903, the processor 902, and the memory 901 may be connected to each other through the communication line 904. The communication line 904 may be a peripheral component interconnect (PCI for short) bus, an extended industry standard architecture (EISA for short) bus, or the like. The communication line 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this application.

The communication interface 903 is configured to communicate with another device or a communication network, such as the Ethernet, a radio access network (RAN), a wireless local area network (WLAN), or a wireline access network by using any apparatus such as a transceiver.

The memory 901 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the communication line 904. The memory may alternatively be integrated with the processor.

The memory 901 is configured to store computer-executable instructions for executing the solutions in this application, and the processor 902 controls the execution of the computer-executable instructions. The processor 902 is configured to execute the computer-executable instructions stored in the memory 901, to implement the MDBV determining method provided in the following embodiments of this application.

Optionally, the computer-executable instructions in this embodiment of this application may also be referred to as application program code. This is not specifically limited in this embodiment of this application.

A person of ordinary skill in the art may understand that first, second, and various reference numerals in this application are merely distinguished for convenient description, and are not used to limit a scope of the embodiments of this application, and also indicate a sequence. The term "and/or" describes an association relationship for describing associated objects and indicates that three relationships may exist. For example, A and/or B may indicate the following three cases: Only A exists, both A and B exist, and only B exists. The character "l" generally indicates an "or" relationship between the associated objects. The term "at least one" means one or more. At least two means two or more. "At least one", "any one", or a similar expression thereof means any combination of the items, including a singular item (piece) or any combination of plural items (pieces). For example, at least one (piece, or type) of a, b, or c may indicate: a, b, c, a and b, a and c, b and c, or a, b, and c, where a, b, and c may be singular or plural. The term "a plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may alternatively be integrated into the processor. The processor and the storage medium may be disposed in an ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and accompanying drawings are merely examples for description of this application defined by the appended claims, and is considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A maximum data burst volume (MDBV) determining method, comprising:
   obtaining, by a policy control network element, an updated segment packet delay budget and service feature information, wherein the service feature information comprises at least any one of: a burst size, a service periodicity, a burst arrival time, a packet arrival time, and a packet size, wherein the burst size indicates a data volume in one service period; and
   determining, by the policy control network element, an updated policy and charging control (PCC) rule based on the updated segment packet delay budget and the service feature information.

2. The method according to claim 1, wherein the updated PCC rule comprises an updated MDBV.

3. The method according to claim 2, wherein the method further comprises:
   sending, by the policy control network element, the updated MDBV to a session management network element, wherein the updated MDBV is for generating a service flow quality of service (QoS) profile.

4. The method according to claim 1, wherein the obtaining, by the policy control network element, service feature information comprises:
   receiving, by the policy control network element, the service feature information from an application function network element.

5. The method according to claim 1, wherein the obtaining, by a policy control network element, an updated segment packet delay budget comprises:
   sending, by the policy control network element, a request message to the session management network element, wherein the request message is for requesting to subscribe to the updated segment packet delay budget; and
   receiving, by the policy control network element, the updated segment packet delay budget from the session management network element.

6. A maximum data burst volume (MDBV) determining method, comprising:
   obtaining, by a first device, an updated segment packet delay budget and an original MDBV; and
   determining, by the first device, an updated MDBV based on the updated segment packet delay budget and the original MDBV.

7. The method according to claim 6, wherein the method further comprises:
   obtaining, by the first device, an original packet delay budget; and
   the determining, by the first device, an updated MDBV based on the updated segment packet delay budget and the original MDBV comprises:
   determining, by the first device, the updated MDBV based on the updated segment packet delay budget, the original packet delay budget, and the original MDBV.

8. The method according to claim 6, wherein the first device is a session management network element; and the method further comprises:
    generating, by the session management network element, a service flow quality of service (QoS) profile based on the updated MDBV; and
    sending, by the session management network element, the QoS profile to an access network device.

9. The method according to claim 8, wherein the obtaining, by a first device, an original MDBV comprises:
    receiving, by the session management network element, a policy and charging control (PCC) rule from a policy control network element, wherein the PCC rule comprises the original MDBV.

10. The method according to claim 6, wherein the first device is an access network device; and the obtaining, by a first device, an original MDBV comprises:
    receiving, by the access network device, a quality of service (QoS) profile from a session management network element, wherein the QoS profile comprises the original MDBV.

11. The method according to claim 6, wherein a segment packet delay budget is an access network segment packet delay budget or a core network segment packet delay budget.

12. A maximum data burst volume (MDBV) determining apparatus, comprising:
    a memory storing executable instructions;
    a processor configured to execute the executable instructions to perform operations of:
    obtaining an updated segment packet delay budget and service feature information, wherein the service feature information comprises at least any one of: a burst size, a service periodicity, a burst arrival time, a packet arrival time, and a packet size, wherein the burst size indicates a data volume in one service period; and
    determining an updated policy and charging control (PCC) rule based on the updated segment packet delay budget and the service feature information.

13. The apparatus according to claim 12, wherein the updated PCC rule comprises an updated MDBV.

14. The apparatus according to claim 13, wherein the processor is configured to execute the executable instructions to perform further operations of:
    sending the updated MDBV to a session management network element, wherein the updated MDBV is for generating a service flow quality of service (QoS) profile.

15. The apparatus according to claim 12, wherein the processor is configured to execute the executable instructions to perform further operations of: receiving the service feature information from an application function network element.

16. A maximum data burst volume (MDBV) determining apparatus, comprising:
    a memory storing executable instructions;
    a processor configured to execute the executable instructions to perform operations of:
    obtaining an updated segment packet delay budget and an original MDBV; and
    determining an updated MDBV based on the updated segment packet delay budget and the original MDBV.

17. The apparatus according to claim 16, wherein the processor is configured to execute the executable instructions to perform further operations of:
    obtaining an original packet delay budget; and
    wherein the operation of determining comprises: determining the updated MDBV based on the updated segment packet delay budget, the original packet delay budget, and the original MDBV.

18. The apparatus according to claim 16, wherein the processor is configured to execute the executable instructions to perform further operations of:
    generating a service flow quality of service (QoS) profile based on the updated MDBV; and
    sending the QoS profile to an access network device.

19. The apparatus according to claim 16, wherein the operation of determining comprises:
    receiving a quality of service (QoS) profile from a session management network element, wherein the QoS profile comprises the original MDBV.

* * * * *